United States Patent
Chen et al.

(10) Patent No.: US 11,221,259 B2
(45) Date of Patent: Jan. 11, 2022

(54) TEMPERATURE COMPUTING PARAMETER PROVIDING CIRCUIT, TEMPERATURE COMPUTING PARAMETER PROVIDING METHOD AND TEMPERATURE MONITORING METHOD

(71) Applicant: Realtek Semiconductor Corp., HsinChu (TW)

(72) Inventors: Shin-Hao Chen, Taichung (TW); Yi-Chang Tu, New Taipei (TW)

(73) Assignee: Realtek Semiconductor Corp., HsinChu (TW)

( * ) Notice: Subject to any disclaimer, the term of this patent is extended or adjusted under 35 U.S.C. 154(b) by 280 days.

(21) Appl. No.: 16/702,490

(22) Filed: Dec. 3, 2019

(65) Prior Publication Data
US 2020/0200615 A1 Jun. 25, 2020

(30) Foreign Application Priority Data
Dec. 20, 2018 (TW) ................. 107146055

(51) Int. Cl.
*G01K 15/00* (2006.01)
*G01K 7/16* (2006.01)

(52) U.S. Cl.
CPC .............. *G01K 15/005* (2013.01); *G01K 7/16* (2013.01)

(58) Field of Classification Search
CPC ........ G01K 15/00; G01K 15/005; G01K 7/16; G01K 7/25
See application file for complete search history.

(56) References Cited

U.S. PATENT DOCUMENTS

| | | | | |
|---|---|---|---|---|
| 3,649,905 A | * | 3/1972 | Krupka | G05F 1/445 323/242 |
| 4,210,024 A | * | 7/1980 | Ishiwatari | G01D 3/0365 374/1 |
| 4,298,947 A | * | 11/1981 | Tamura | F25D 29/005 374/170 |
| 4,914,357 A | * | 4/1990 | Valley | G05F 1/5735 315/309 |

(Continued)

FOREIGN PATENT DOCUMENTS

| | | |
|---|---|---|
| EP | 2 806 656 A1 | 11/2014 |
| WO | 2004/082322 A2 | 9/2004 |
| WO | 2018/057471 A1 | 3/2018 |

*Primary Examiner* — Tung S Lau
(74) *Attorney, Agent, or Firm* — Winston Hsu

(57) ABSTRACT

A temperature computing parameter providing circuit, configured to generate sensing voltage values and calibrated voltage values as temperature computing parameters for a target electronic device, including: a parameter computing circuit, configured to compute a reference voltage, which is a cross voltage of a reference resistor coupled to the target electronic device in series, to generate a reference voltage value, and to compute the sensing voltage, which is a cross voltage of the target electronic device, to generate the sensing voltage value; a reference temperature sensing circuit, configured to sense a current reference temperature of the reference resistor; and a computing circuit, configured to calibrate the reference voltage value to generate the calibrated voltage value according to a calibrating function and the current reference temperature. The calibrating function corresponds to a resistance-temperature variation function.

18 Claims, 5 Drawing Sheets

(56) References Cited

U.S. PATENT DOCUMENTS

| | | | | |
|---|---|---|---|---|
| 5,914,629 | A * | 6/1999 | Maki | G01K 7/01 |
| | | | | 327/512 |
| 6,441,674 | B1 * | 8/2002 | Lin | G01K 7/01 |
| | | | | 327/512 |
| 6,795,321 | B2 * | 9/2004 | Balakrishnan | G01R 19/16523 |
| | | | | 363/21.15 |
| 7,310,001 | B2 * | 12/2007 | Shigeta | G01R 19/16547 |
| | | | | 324/750.03 |
| 9,794,687 | B2 * | 10/2017 | Napoli | H03G 3/3005 |
| 9,924,287 | B2 * | 3/2018 | Macours | H04R 29/001 |
| 9,934,753 | B2 * | 4/2018 | Nam | G01K 7/22 |
| 10,795,390 | B1 * | 10/2020 | Philbrick | G05F 1/567 |
| 2010/0259313 | A1 * | 10/2010 | Li | G01K 7/22 |
| | | | | 327/512 |
| 2011/0043957 | A1 * | 2/2011 | Tseng | H02M 1/32 |
| | | | | 361/93.8 |
| 2013/0121472 | A1 * | 5/2013 | Wang | G01R 19/32 |
| | | | | 378/121 |
| 2017/0010568 | A1 * | 1/2017 | Kozuma | G03G 15/2028 |
| 2017/0080820 | A1 * | 3/2017 | Sun | H02J 7/007 |
| 2018/0156671 | A1 * | 6/2018 | Huang | G01K 7/24 |

\* cited by examiner

TEMPERATURE COMPUTING PARAMETER PROVIDING CIRCUIT, TEMPERATURE COMPUTING PARAMETER PROVIDING METHOD AND TEMPERATURE MONITORING METHOD

BACKGROUND OF THE INVENTION

1. Field of the Invention

The present invention relates to a temperature computing parameter providing circuit, a temperature computing parameter providing method, and a temperature monitoring method, and particularly relates to a temperature computing parameter providing circuit, a temperature computing parameter providing method, and a temperature monitoring method which can calibrate the sensing voltage variation (nonlinearity) caused by the temperature in real time.

2. Description of the Prior Art

Modern electronic devices become smaller and smaller, so the sizes of the speakers in the electronic device correspondingly become smaller. However, when the electronic device size is small, the speaker still need to have a certain degree of performance, so its power (such as its operating voltage or operating current) is often adjusted to be higher. In order to prevent the voice coil in the speaker from being damaged due to high power, a temperature monitoring system is often used to control its temperature.

However, a conventional temperature monitoring system has some disadvantages. For example, a conventional temperature monitoring system may require a sensing voltage value of the speaker, a sensing current value, and a temperature monitoring system needs the temperature of the speaker or a part of the temperature monitoring system to perform temperature monitoring, thereby requiring more transmission terminals (e.g. pins) to transmit and receive the above-mentioned parameters. Accordingly, the required area of the IC (integrated circuit) is increased and the complexity of the associated wiring increases. In addition, transmission and receiving of the sensing voltage value, the sensing current value, and the temperature must be synchronized, otherwise the subsequent calculation errors will be made. Moreover, the conventional temperature monitoring system has to compute the voice coil temperature according to three kinds of parameters, thus increases the calculation complexity, and the temperature transmission also occupies the bandwidth of the data transmission and reduces the speed of the temperature monitoring operation.

SUMMARY OF THE INVENTION

Therefore, one objective of the present invention is to provide a temperature parameter providing circuit and a temperature computing parameter providing method, which can calibrate the voltage variation (nonlinearity) due to temperature in real time.

Another objective of the present invention is to provide a temperature monitoring method, which can calibrate the voltage variation (nonlinearity) due to temperature in real time.

One embodiment of the present invention discloses a temperature computing parameter providing circuit configured to generate a sensing voltage value and a calibrated voltage value as temperature computing parameters for a target electronic device. The temperature computing parameter providing circuit comprises: a parameter computing circuit, coupled to the target electronic device, configured to compute a reference voltage to generate a reference voltage value, the reference voltage is a cross voltage of a reference resistor coupled to the target electronic device in series, and to compute the sensing voltage which is a cross voltage of the target electronic device to generate the sensing voltage value; a reference temperature sensing circuit, coupled to the reference resistor, configured to sense a current reference temperature of the reference resistor; and a calibrating circuit, coupled to the parameter computing circuit and the reference temperature sensing circuit, configured to calibrate the reference voltage value according to a calibrating function and the current reference temperature to generate the calibrated voltage value. The calibrating function corresponds to a resistance-temperature variation (nonlinear) function of the reference resistor.

Other embodiments of the present invention provide a temperature monitoring system corresponding to above-mentioned temperature computing parameter providing circuit and method.

In view of above-mentioned embodiments, since calibration is performed by using the correction circuit while the temperature calculation parameter providing circuit outputting the reference voltage value, the temperature calculation parameter providing circuit does not need to separately output the temperature to the temperature monitoring circuit. Thereby solving the problem of the prior art that it needs three sets of independent transceiving terminals for transceiving the parameters required for the temperature calculation. Further, it does not need to design the synchronization mechanism for the temperature calculations based on three kinds of different necessary parameters. Additionally, the required bandwidth is also reduced. Besides, the temperature monitoring circuit only needs to compute the temperature according to the two kinds of necessary parameters, which reduces the complexity of the calculation. It should be noted, however, the scope of the present invention is not limited to be applied to solve these problems.

These and other objectives of the present invention will no doubt become obvious to those of ordinary skill in the art after reading the following detailed description of the preferred embodiment that is illustrated in the various figures and drawings.

DETAILED DESCRIPTION

The contents of the present invention will be described below in terms of various embodiments. However, please note that the components in the various embodiments may be divided into more components or integrated into fewer components while maintaining the same function. In addition, the following embodiments are described by taking the temperature of the speaker voice coil as an example, but the content provided by the present invention can be applied to any target electronic device having a temperature-dependent resistance value, and the target electronic device can comprise a single component (such as a resistor) or multiple components.

Figure 1:
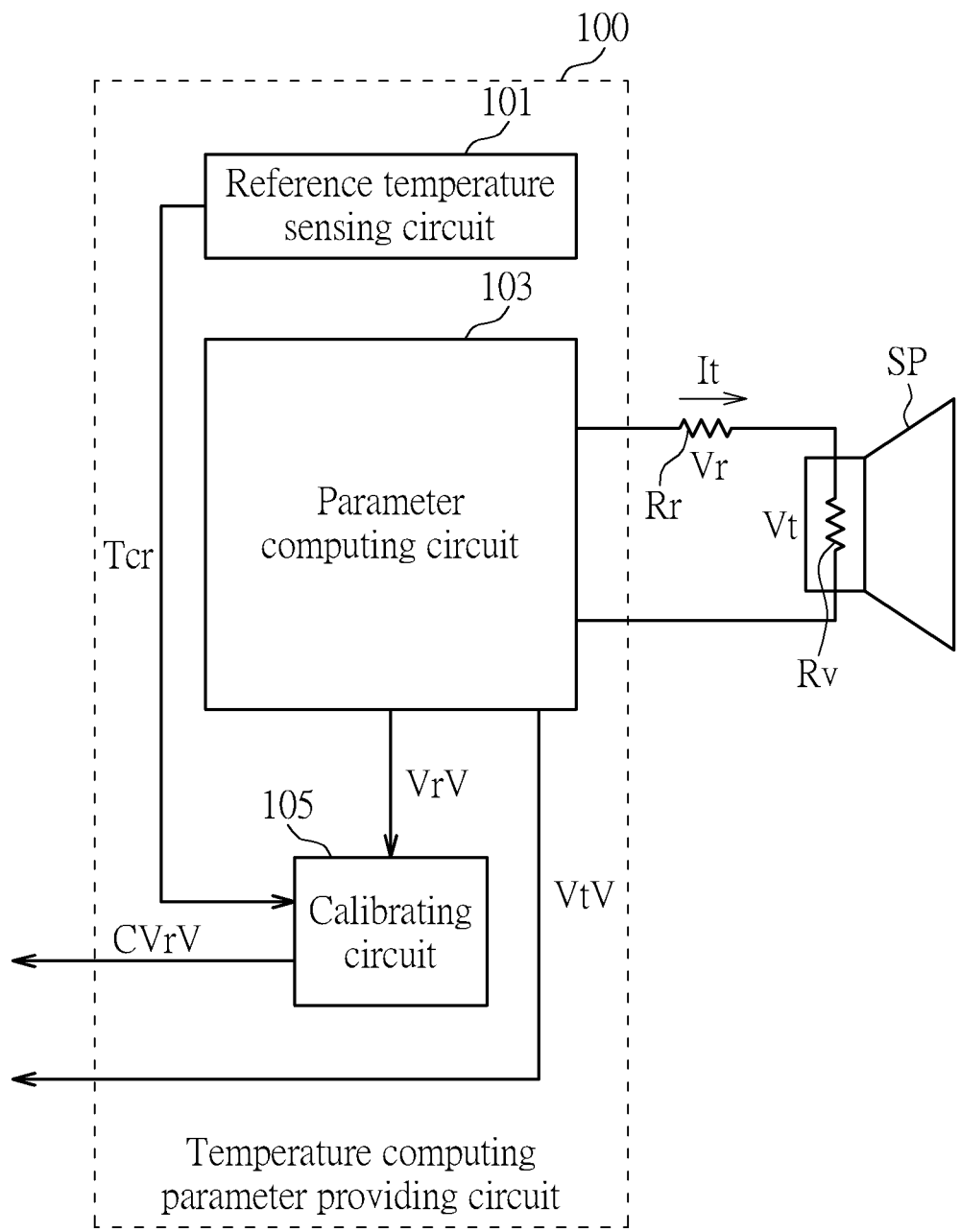
FIG. 1 is a block diagram illustrating a temperature computing parameter providing circuit according to one embodiment of the present invention.

FIG. 1 is a block diagram of a temperature computing parameter providing circuit according to one embodiment of the present invention. As shown in FIG. 1, the speaker SP comprises a voice coil, and the voice coil resistor Rv is an equivalent resistor of the voice coil. Since the voice coil can be made of metal such as copper (but not limited), the equivalent resistance thereof can be linear with its temperature in such case. Therefore, in such embodiment, as long as the resistance value of the voice coil resistor Rv at a specific temperature (e.g. 25 degrees) is known, the current temperature of the voice coil can be computed from the current resistance value of the voice coil resistor Rv.

The temperature computing parameter providing circuit 103 computes the sensing current It flowing through the voice coil resistor Rv and the sensing voltage Vt which is a cross voltage of the voice coil resistor Rv. Also, in one embodiment, the sensing voltage value VtV and the calibrated voltage value CVrV are generated to a temperature monitoring circuit (not shown in FIG. 1) as a temperature computing parameter. The temperature monitoring circuit computes the current resistance value of the voice coil resistor Rv based on the sensing voltage value VtV and the calibrated voltage value CVrV, and computes the voice coil temperature accordingly.

The temperature computing parameter providing circuit 100 comprises a reference temperature sensing circuit 101, a parameter computing circuit 103, and a calibrating circuit 105. In this embodiment, a reference coil Rr is coupled to the voice coil of the speaker Sp in series. As described above, the voice coil resistor Rv is the equivalent resistor of the voice coil, so in the following descriptions, the voice coil is represented as the voice coil resistor Rv.

The reference temperature sensing circuit 101 is coupled to the reference resistor Rr and the calibrating circuit 105 for sensing a current reference temperature Tcr of the reference resistor Rr and providing it to the calibrating circuit 105. The parameter computing circuit 103 is coupled to the reference resistor Rr and the voice coil resistor Rv for computing a reference voltage Vr to generate a reference voltage value VrV. The reference voltage Vr is a cross voltage of the reference resistor Rr. The parameter computing circuit 103 further computes a sensing voltage Vt, which is a cross voltage of the coil resistor Rv to generate a sensing voltage value VtV. The calibrating circuit 105 is coupled to the parameter computing circuit 103 for calibrating the reference voltage value VrV according to a calibrating function and the current reference temperature Tcr to generate a calibrated voltage value CVrV. The calibrating function corresponds to a resistance-temperature variation function (that is, the nonlinearity of resistance-temperature characteristic) of the reference resistor Vr. The calibrating circuit 105 can be a hardware, such as a circuit containing a plurality of logic gates, or a firmware, such as a processor installed at least one program.

In one embodiment, the aforementioned resistance-temperature variation (nonlinear) function is $Rr(T1)=Rr(T0)\times(1+\alpha s(T1-T0))$. T0 is an initial reference temperature of the reference resistor Rr (e.g. 25 degrees) and T1 is the current reference temperature (i.e. the aforementioned current reference temperature Tcr). Rr(T1) and Rr(T0) respectively represent the resistance values of the reference resistor Rr at the temperatures T1 and T0. $\alpha s$ is the temperature coefficient of the reference resistor Rr, which can be related to a material or a manufacturing process of the voice coil. In one embodiment, the calibrating circuit 105 divides the reference voltage value VrV by $(1+\alpha s(T1-T0))$ to calibrate the reference voltage value VrV, to generate a calibrated voltage value CVrV. If the reference voltage value VrV is not calibrated, the resistance value of the reference resistor Rr varies corresponding to the temperature, which will affect the calculation of the voice coil temperature.

As above-mentioned, the voice coil of the speaker can be replaced by other target electronic devices. However, since different target electronic devices may have different resistance-temperature variation (nonlinearity) functions, the calibrating circuit 105 may take different calibrating methods correspondingly. For example, the calibrating circuit 105 can pre-record a lookup table which is built according to a resistance-temperature variation function comprising the relation that which calibrating value should be used at which temperature, and the calibrating circuit 105 can refer to the lookup table to calibrate the reference voltage value VrV by increasing or decreasing the reference voltage value VrV. Briefly, the calibrating circuit 105 can generate a calibrated voltage value CVrV according to the resistance-temperature variation function and the current reference temperature to generate the calibrated voltage value CVrV, to reflect the effect of the resistance variation (nonlinearity) of the reference resistance Rv due to the temperature. Such variations should be included within the scope of the present invention.

The following descriptions explain why the reference voltage value VrV divided by $(1+\alpha s(T1-T0))$ can cancel out the effect that the temperature of the resistance value causes to the reference resistor Rr. Please note that the following equation is only used to illustrate the benefit of dividing the reference voltage value VrV by It is not intended to limit the of the temperature calculation parameter providing circuit provided by the present invention.

As above-mentioned, the resistance-temperature variation (nonlinear) function of the reference resistor Rr is $Rr(T1)=Rr(T0)\times(1+\alpha s(T1-T0))$. Therefore, a current flowing through the reference resistor Rr while the reference resistor Rr has a temperature T1 can be represented as following Equation (1):

$$\frac{Vr(T1)}{Rr(T1)} = \frac{Vr(T1)}{Rr(T0)\times(1+\alpha s(T1-T0))} \qquad \text{Equation (1)}$$

If the cross voltage Vt of the coil resistor Rv is divided by a cross voltage Vr of the reference resistor Rr at the initial reference temperature T0, the following Equation (2) can be acquired:

$$\frac{Vt(T0)}{Vr(T0)} = \frac{Vt(T0)}{It(T0)\times Rr(T0)} \qquad \text{Equation (2)}$$

If the cross voltage Vt of the coil resistor Rv is divided by a cross voltage Vr of the reference resistor Rr at the current reference temperature T1, the following Equation (3) can be acquired:

$$\frac{Vt(T1)}{Vr(T1)} = \frac{Vt(T1)}{It(T1) \times Rr(T1)} \quad \text{Equation (3)}$$

Also, the Equation (4) can be acquired if the Equation (3) is divided by Equation (2):

$$\frac{Vt(T1) \times Vr(T0)}{Vr(T1) \times Vt(T0)} = \frac{Rv(T1) \times Rr(T0)}{Rr(T1) \times Rv(T0)} \quad \text{Equation (4)}$$

Besides, the Equation (4) can be transformed to Equation (5), since $Rr(T1)=Rr(T0) \times (1+\alpha s(T1-T0))$ $$\frac{Vt(T1) x Vr(T0)}{Vr(T1) x Vt(T0)} = \frac{Rv(T1)}{Rv(T0) \times (1+\alpha s(T1-T0))} \quad \text{Equation (5)}$$

Then, Equation (6) can be acquired based on Equation (5):

$$\frac{Vt(T1) x Vr(T0)}{Vr(T1) x Vt(T0)} \times (1+\alpha s(T1-T0)) = \frac{Rv(T1)}{Rv(T0)} \quad \text{Equation (6)}$$

It can be seen from the Equation (6) that the resistance Rv (T1) of the voice coil resistor Rv at the current reference temperature T1 is affected by the reference voltage Vr, the sensing voltage Vt and $(1+\alpha s(T1-T0))$. If the resistance Rv (T1) is not calibrated, a wrong voice coil resistance Rv(T1) will be acquired. In the conventional temperature monitoring system, the temperature of the voice coil resistor Rv must be transmitted to an external temperature monitoring circuit, thus has the disadvantage stated in descriptions of the prior art. That is, more transceiving terminals (e.g. pins) are required to transceive the sensing voltage value, the sensing current value, and the temperature. Further, the transceiving of the sensing voltage value, the sensing current value, and the temperature must be synchronized, and the temperature monitoring circuit must compute the voice coil temperature problem according to three kinds of parameters.

Please refer to FIG. 1 again, since the reference resistor Rr and the voice coil resistor Rv are coupled in series, the current flowing through will be the same. Accordingly, the voltage ratio of the reference resistor Rr and the voice coil resistor Rv at the same temperature such as $$\frac{Vt(T1)}{Vr(T1)},$$

can represent the ratio of resistance values thereof. Therefore, if the resistance variation of the reference resistor Rr due to the temperature can be cancelled out, thereby the reference resistor Rr can be regarded as a resistor having a fixed resistance value. Therefore, the resistance value of the voice coil resistor Rv can be computed according to the voltage ratio of the reference resistor Rr and the voice coil resistor Rv at the same temperature, and then the voice coil temperature can be accordingly acquired.

Since $Rr(T1)=Rr(T0) \times (1+\alpha s(T1-T0))$, the above-mentioned Equation (3) can be transformed to Equation (7):

$$\frac{Vt(T1)}{Vr(T1)} = \frac{Vt(T1)}{It(T1) \times Rr(T0) \times (1+\alpha s(T1-T0))} \quad \text{Equation (7)}$$

Therefore, if Vr(T1) is divided by $(1+\alpha s(T1-T0))$ to generate the calibrated voltage CVr(T1), which is a voltage of the reference resistor Rr at the temperature T1, Equation (7) becomes Equation (8), in which $$CVr(T1) = \frac{Vr(T1)}{1+\alpha s(T1-T0)}; \frac{Vt(T1)}{CVr(T1)} = \frac{Vt(T1)}{It(T1) \times Rr(T0)} \quad \text{Equation (8)}$$

That is, the calibrated voltage CVr(T1) has reflected (or included) the resistance variation (nonlinearity) of the reference resistor Rr at the current reference temperature T1. Accordingly, in the Equation (8), if Vt(T1), Vr(T1) are measured, a fixed value of Rr(T0) is known, and calibrating Vr(T1) to CVr(T1), the resistance variation of the reference resistor Rr at the current reference temperature T1 can be obtained, and the temperature is not needed to be transmitted to the temperature monitoring circuit for calibrating. Thereby the disadvantages of the prior art can be improved. The difference between $$\frac{Vt(T1)}{CVr(T1)} \text{ and } \frac{Vt(T1)}{Vr(T1)},$$

which have the same values, is only that whether Vr(T1) is divided by $(1+\alpha s(T1-T0))$ or not, so the voice coil temperature can be obtained accordingly.

Figure 2:
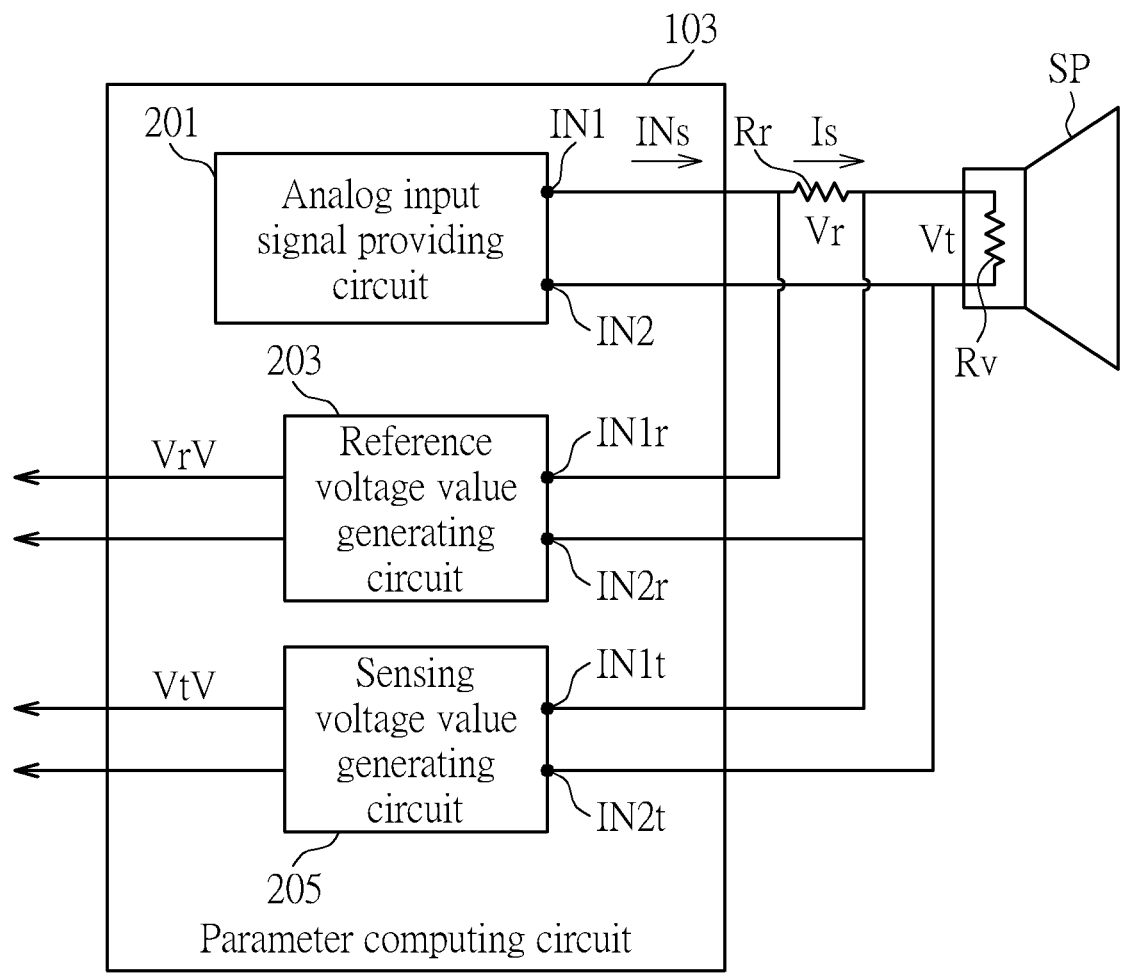
FIG. 2 is a block diagram illustrating a detail structure for the parameter computing circuit in FIG. 1, according to one embodiment of the present invention.
Figure 3:
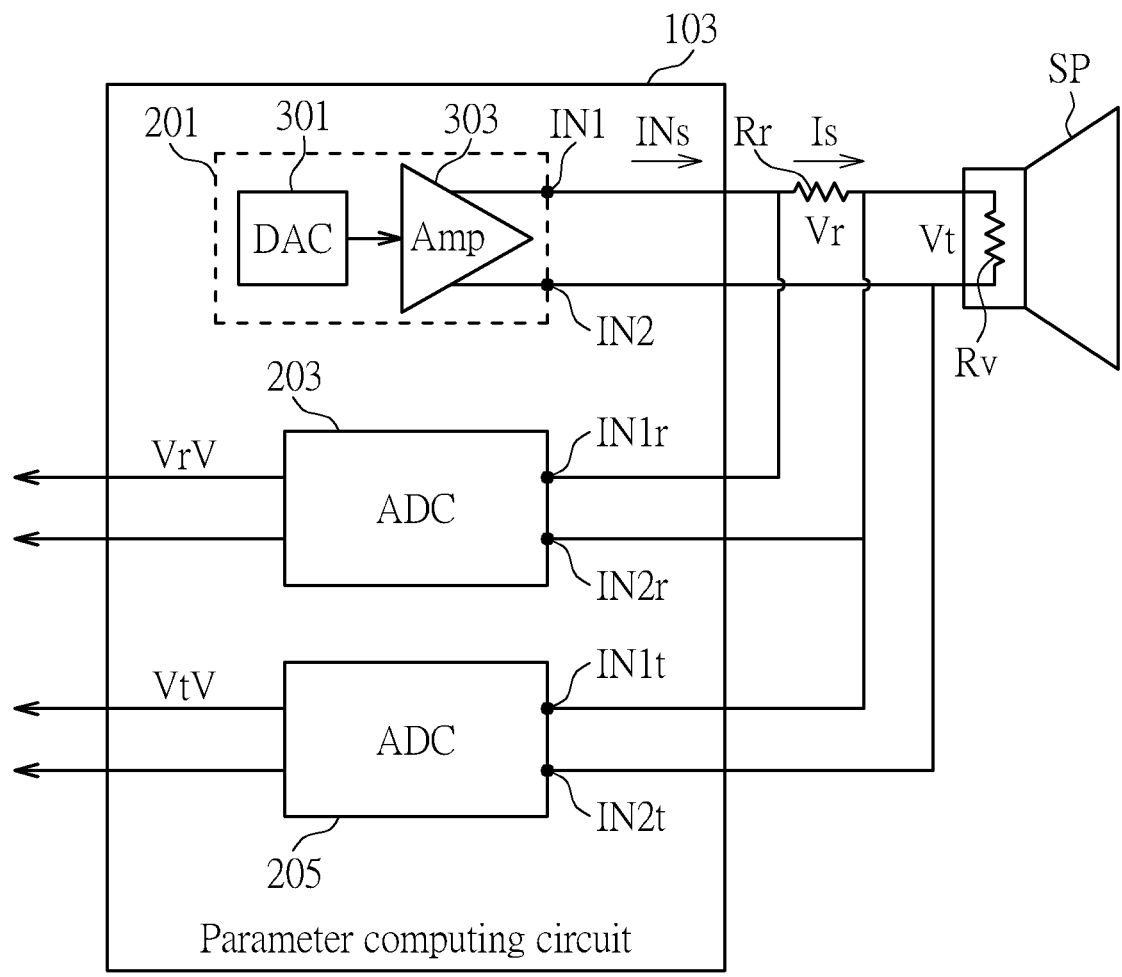
FIG. 3 is a circuit diagram illustrating a further detail structure for the parameter computing circuit in FIG. 1, according to one embodiment of the present invention.

FIG. 2 is a block diagram illustrating a detail structure for the parameter computing circuit in FIG. 1, according to one embodiment of the present invention. Please note, in order to simplify the drawings, the terminals of some components are not labeled, but the description of the drawings and the description of the specification clearly shows the indicated terminals. As shown in FIG. 3, the parameter calculation circuit 103 comprises an analog input signal providing circuit 201, a reference voltage value generating circuit 203, and a sensing voltage value generating circuit 205.

The analog input signal providing circuit 201 is configured to provide an input signal Ins to the reference resistor Rr and the coil resistor Rv to generate the reference voltage Vr and the sensing voltage Vt. For more details, the analog input signal providing circuit 201 comprises a first input terminal IN1 and a second input terminal IN2. The first input terminal IN1 is coupled to a first terminal of the reference resistor R1, and a second terminal of the reference resistor Rr is coupled to a first terminal of the coil resistor Rv. Also, the second input terminal IN2 is coupled to a second terminal of the coil resistor Rv. The analog input signal providing circuit 201 provides an input signal Ins to the reference resistor Rr and the coil resistor Rv at the first input terminal IN1 to generate the reference voltage Vr and the sensing voltage Vt.

The reference voltage value generating circuit 203 comprises a first input terminal IN1r and a second input terminal IN2r. The first input terminal IN1r and the second input terminal IN2r are respectively coupled to a first terminal and a second terminal of the reference resistor Rr, to receive the reference voltage Vr and to accordingly generate the reference voltage value VrV. The sensing voltage value generating circuit 205 comprises a first input terminal IN1t and a second input terminal IN2t, which are respectively coupled to a first terminal and a second terminal of the voice coil resistor Rv, to receive the sensing voltage Vt and to accordingly generate the sensing voltage value VtV.

The analog input signal providing circuit 201, the reference voltage value generating circuit 203, and the sensing voltage value generating circuit 205 can be implemented by various circuits. FIG. 3 is a circuit diagram illustrating a further detail structure for the parameter computing circuit 103 in FIG. 1, according to one embodiment of the present invention. As illustrated in FIG. 3, the analog input signal providing circuit 201 comprises a DAC 301 (Digital to Analog Converter) and an amplifier 303. The DAC 301 can transform a digital signal to an analog signal, and the amplifier 303 can amplify the analog signal to generate the input signal INs. In the embodiment of FIG. 3, the voltage value generating circuit 203, and the sensing voltage value generating circuit 205 are ADC (Analog to digital converter). It will be appreciated that the circuits in FIG. 2 and FIG. 3 are only for examples and do not mean to limit the scope of the present invention.

Figure 4:
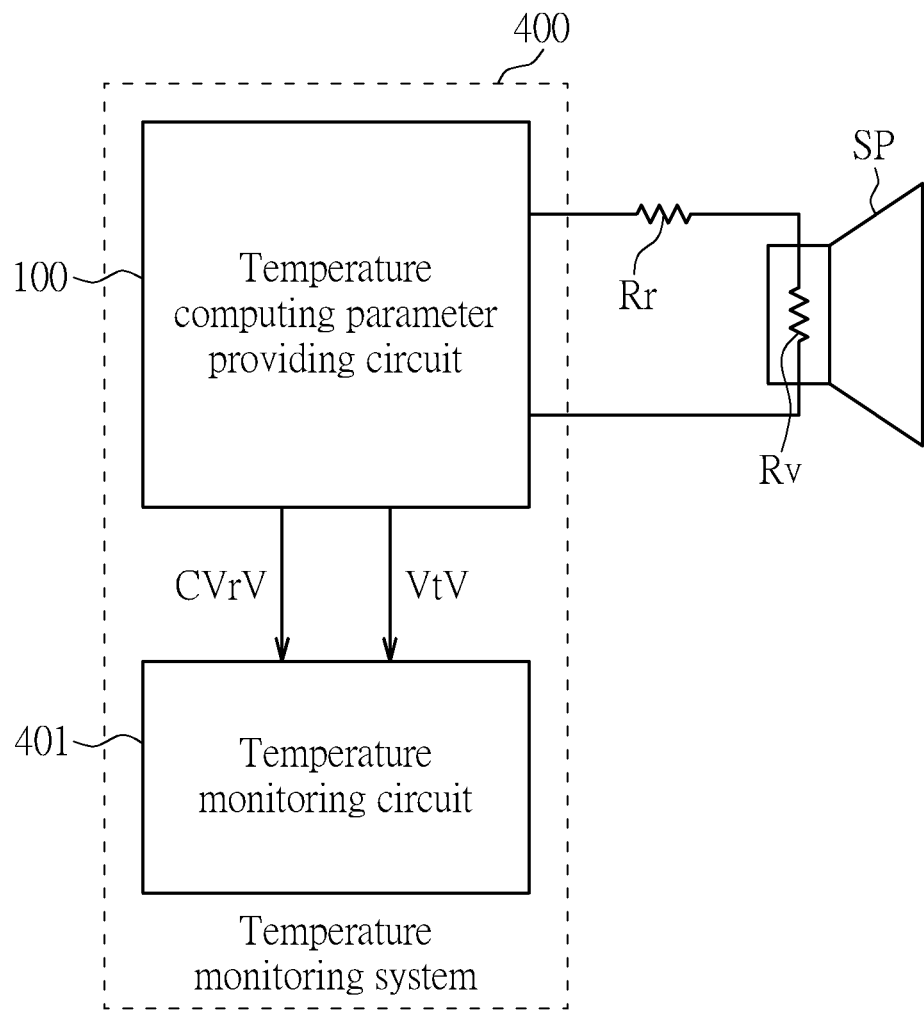
FIG. 4 is a block diagram illustrating a temperature monitoring system according to one embodiment of the present invention.

FIG. 4 is a block diagram illustrating a temperature monitoring system according to one embodiment of the present invention. As illustrated in FIG. 4, the temperature monitoring system 400 comprises the above-mentioned temperature computing parameter providing circuit 100 and a temperature monitoring circuit 401. The temperature computing parameter providing circuit 100 generate the sensing voltage value VtV and the calibrated voltage value CVrV and transmit to the temperature monitoring circuit 401, as above-mentioned descriptions. Also, the temperature monitoring circuit 401 computes a temperature of the speaker voice coil according to the sensing voltage value VtV and the calibrated voltage value CVrV, and limits a power rate of the speaker SP (e.g. decreasing an operating voltage or an operating current thereof) when the speaker voice coil temperature is higher than a threshold value.

In one embodiment, since the temperature monitoring circuit 401 computes the value of the voice coil resistor Rv according to the ratio of the sensing voltage Vt and the calibrated voltage CVr, and computes the voice coil temperature according to the recorded temperature resistance variation (nonlinear) relationship. However, it is not limited to compute the voice coil temperature in this way.

In one embodiment, the temperature computing parameter providing circuit 100 and the temperature monitoring circuit 401 are independent IC (integrated circuit). In this case, the temperature computing parameter providing circuit 100 and the temperature monitoring circuit 401 only need two sets of data transmitting terminal and data receiving terminal. The data transmitting terminal and the data receiving terminal can be pins or any interface can transmit and access data, thereby solving the problem of the conventional temperature monitoring system.

Figure 5:
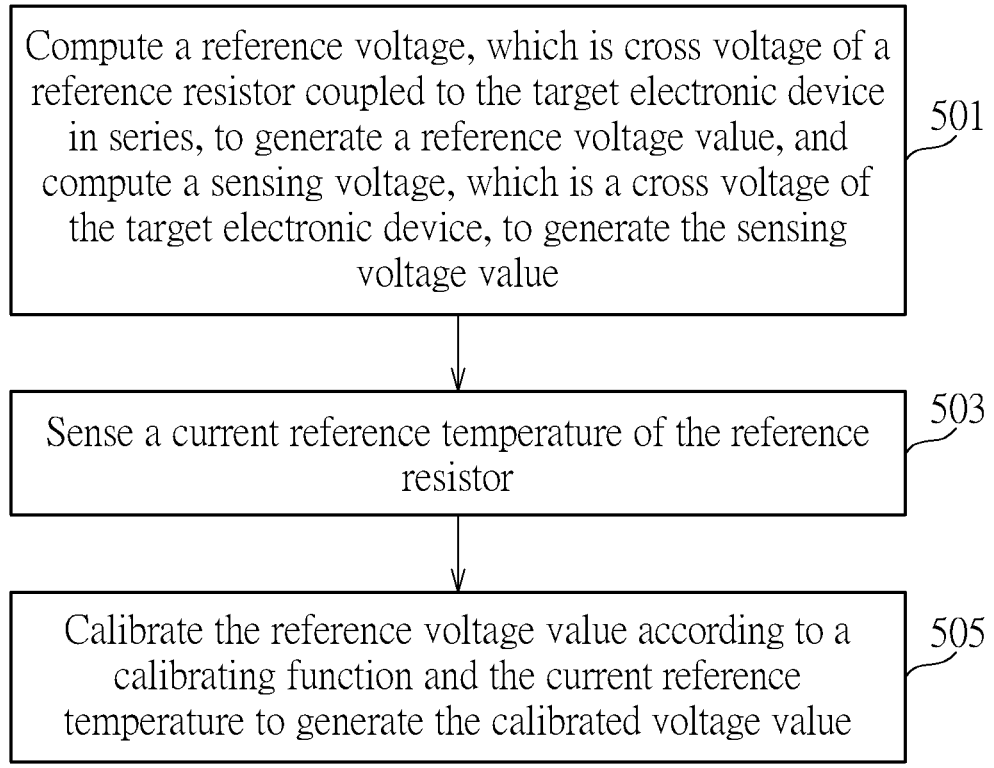
FIG. 5 is a block diagram illustrating a temperature computing parameter providing circuit according to one embodiment of the present invention.

In view of above-mentioned embodiments, a temperature computing parameter providing method can be acquired, which comprise following steps illustrated in FIG. 5:

Step 501

Compute a reference voltage to generate a reference voltage value VrV, the reference voltage is a cross voltage of a reference resistor coupled to the target electronic device in series (e.g. Vr in FIG. 2), and computing a sensing voltage (e.g. Vt in FIG. 2) which is a cross voltage of the target electronic device to generate the sensing voltage value VtV.

Step 503

Sense a current reference temperature Tcr of the reference resistor.

Step 505

Calibrate the reference voltage value according to a calibrating function and the current reference temperature to generate the calibrated voltage value.

The calibrating function corresponds to a resistance-temperature variation (nonlinear) function of the reference resistor. Other detail steps are illustrated in above-mentioned embodiments, thus descriptions thereof are omitted for brevity here.

If the method of FIG. 5 is applied to the temperature monitoring method, the method further comprises computing the temperature of the target electronic device according to the sensing voltage value VtV and the calibrated voltage value CVrV, and adjusting the power of the target electronic device when the temperature exceeds a threshold value.

In view of above-mentioned embodiments, since calibration is performed by using the correction circuit while the temperature calculation parameter providing circuit outputting the reference voltage value, the temperature calculation parameter providing circuit does not need to separately output the temperature to the temperature monitoring circuit. Thereby solving the problem of the prior art that it needs three sets of independent transceiving terminals for transceiving the parameters required for the temperature calculation. Further, according to the present invention, it does not need to design the synchronization mechanism for the temperature calculations based on three kinds of different necessary parameters. Additionally, the required bandwidth is also reduced. Besides, the temperature monitoring circuit only needs to compute the temperature according to the two kinds of necessary parameters, which reduces the complexity of the calculation. It should be noted that the scope of the present invention is not limited to be applied to solve these problems.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A temperature computing parameter providing circuit, configured to generate a sensing voltage value and a calibrated voltage value as temperature computing parameters for a target electronic device, comprising:
    a parameter computing circuit, coupled to the target electronic device, configured to compute a reference voltage to generate a reference voltage value, the reference voltage is a cross voltage of a reference resistor coupled to the target electronic device in series, and to compute the sensing voltage which is a cross voltage of the target electronic device to generate the sensing voltage value;
    a reference temperature sensing circuit, coupled to the reference resistor, configured to sense a current reference temperature of the reference resistor; and
    a calibrating circuit, coupled to the parameter computing circuit and the reference temperature sensing circuit, configured to calibrate the reference voltage value according to a calibrating function and the current reference temperature to generate the calibrated voltage value;
    wherein the calibrating function corresponds to a resistance-temperature variation function of the reference resistor.

2. The temperature computing parameter providing circuit of claim 1, wherein the calibrating circuit generates the calibrated voltage value according to the resistance-temperature variation function and the current reference temperature, wherein the calibrated voltage corresponds to a resistance variation of the reference resistor due to a temperature.

3. The temperature computing parameter providing circuit of claim 1, wherein the resistance-temperature variation function is $Rr(T1)=Rr(T0)\times(1+\alpha s(T1-T0))$ wherein T0 is an initial reference temperature and T1 is the current reference temperature, $Rr(T1)$ and $Rr(T0)$ respectively indicates resistance values of the reference resistor at T1 and T0, and $\alpha s$ is a temperature coefficient of the reference resistor.

4. The temperature computing parameter providing circuit of claim 3, wherein the calibrating circuit divides the reference voltage value by $(1+\alpha s(T1-T0))$ to calibrate the reference voltage value, to generate the calibrated voltage value.

5. The temperature computing parameter providing circuit of claim 1, wherein the parameter computing circuit comprises:
an analog input signal providing circuit, comprising a first input terminal and a second input terminal, the first input terminal is coupled to a first terminal of the reference resistor, a second terminal of the reference resistor is coupled to a first input terminal of the target electronic device, the second input terminal is coupled to a second terminal of the target electronic device;
wherein the analog input signal providing circuit provides an input signal at the first input terminal to the reference resistor and the target electronic device to generate the reference voltage and the sensing voltage, and the sensing voltage is a cross voltage of the first terminal and the second terminal of the target electronic device.

6. The temperature computing parameter providing circuit of claim 5, wherein the reference computing circuit further comprises:
a reference voltage generating circuit, comprising a first input terminal and a second input terminal, wherein the first input terminal and the second input terminal of the reference voltage generating circuit are respectively coupled to the first terminal and the second terminal of the reference resistor, configured to receive the reference voltage and to generate the reference voltage value accordingly; and
a sensing voltage value generating circuit, comprising a first input terminal and a second input terminal, wherein the first input terminal and the second input terminal of the sensing voltage value generating circuit are respectively coupled to the first terminal and the second terminal of the target electronic device, configured to receive the sensing voltage and to accordingly generate the sensing voltage value.

7. The temperature computing parameter providing circuit of claim 6, provided in an IC which comprising two data transmitting terminals respectively transmitting the sensing voltage value and the calibrated voltage value, and the IC does not output a value of the current reference temperature.

8. The temperature computing parameter providing circuit of claim 1, wherein a resistance value of the target electronic device is linear with a temperature, and the target electronic device is a voice coil.

9. A temperature computing parameter providing method, for generating a sensing voltage value and a calibrated voltage value as temperature computing parameters for a target electronic device, comprising:
(a) computing a reference voltage to generate a reference voltage value, the reference voltage is a cross voltage of a reference resistor coupled to the target electronic device in series, and computing a sensing voltage which is a cross voltage of the target electronic device to generate the sensing voltage value;
(b) sensing a current reference temperature of the reference resistor; and
(c) calibrating the reference voltage value according to a calibrating function and the current reference temperature to generate the calibrated voltage value;
wherein the calibrating function corresponds to a resistance-temperature variation function of the reference resistor.

10. The temperature computing parameter providing method of claim 9, wherein the step (c) generates the calibrated voltage value according to the resistance-temperature variation function and the current reference temperature, wherein the calibrated voltage corresponds to a resistance variation of the reference resistor due to a temperature.

11. The temperature computing parameter providing method of claim 9, wherein the resistance-temperature variation function is $Rr(T1)=Rr(T0)\times(1+\alpha s(T1-T0))$, wherein T0 is an initial reference temperature and T1 is the current reference temperature, $Rr(T1)$ and $Rr(T0)$ respectively indicate resistance values of the reference resistor at T1 and T0, and $\alpha s$ is a temperature coefficient of the reference resistor.

12. The temperature computing parameter providing method of claim 11, wherein the step (c) divides the reference voltage value by $(1+\alpha s(T1-T0))$ to calibrate the reference voltage value, to generate the calibrated voltage value.

13. The temperature computing parameter providing method of claim 9, wherein a resistance value of the target electronic device is linear with a temperature, and the target electronic device is a voice coil.

14. A temperature monitoring method, for generating a sensing voltage value and a calibrated voltage value as temperature computing parameters for a target electronic device and for monitoring a temperature of the target electronic device, comprising:
(a) computing a reference voltage to generate a reference voltage value which is a cross voltage of a reference resistor coupled to the target electronic device in series, and computing a sensing voltage which is a cross voltage of the target electronic device to generate the sensing voltage value;
(b) sensing a current reference temperature of the reference resistor;
(c) calibrating the reference voltage value according to a calibrating function and the current reference temperature to generate the calibrated voltage value; and
(d) computing the temperature according to the sensing voltage value and the calibrated voltage value, and adjusting a power of the target electronic device when the temperature is over a threshold value;
wherein the calibrating function corresponds to a resistance-temperature variation function of the reference resistor.

15. The temperature monitoring method of claim 14, wherein the step (c) generates the calibrated voltage value according to the resistance-temperature variation function and the current reference temperature, wherein the calibrated voltage corresponds to a resistance variation of the reference resistor due to a temperature.

16. The temperature monitoring method of claim 14, wherein the resistance-temperature variation function is $Rr(T1)=Rr(T0)\times(1+\alpha s(T1-T0))$, wherein T0 is an initial reference temperature and T1 is the current reference temperature, $Rr(T1)$ and $Rr(T0)$ respectively indicate resistance values of the reference resistor at T1 and T0, and $\alpha s$ is a temperature coefficient of the reference resistor.

17. The temperature monitoring method of claim 16, wherein the step (c) divides the reference voltage value by $(1+\alpha s(T1-T0))$ to calibrate the reference voltage value to generate the calibrated voltage value.

18. The temperature monitoring method of claim 14, wherein a resistance value of the target electronic device is linear with a temperature, and the target electronic device is a voice coil.

* * * * *